United States Patent [19]

Harandi et al.

[11] Patent Number: 5,151,393
[45] Date of Patent: Sep. 29, 1992

[54] STAGED PROCESS FOR REACTIVATION OF SPENT ZEOLITE CATALYST PARTICLES

[75] Inventors: Mohsen N. Harandi, Lawrenceville; Hartley Owen, Belle Mead, both of N.J.

[73] Assignee: Mobil Oil Corporation, Fairfax, Va.

[21] Appl. No.: 689,570

[22] Filed: Apr. 23, 1991

[51] Int. Cl.⁵ .................. B01J 38/10; B01J 29/38; C07C 11/20; C10G 11/05
[52] U.S. Cl. .................. 502/53; 208/111; 502/34; 585/408; 585/640; 585/733
[58] Field of Search ............ 502/53, 34; 208/111, 208/120; 585/640, 408

[56] References Cited

U.S. PATENT DOCUMENTS

| | | | |
|---|---|---|---|
| 3,360,481 | 12/1967 | McLaren et al. | 502/53 |
| 3,412,013 | 11/1968 | Bowles | 502/53 |
| 4,181,598 | 1/1980 | Gillespie | 208/58 |
| 4,283,271 | 8/1981 | Garwood | 208/59 |
| 4,358,395 | 11/1982 | Haag | 585/408 |
| 4,419,220 | 12/1983 | LaPierre | 208/111 |
| 4,423,272 | 12/1983 | Forbus et al. | 502/53 |
| 4,508,836 | 4/1985 | Haag | 502/53 |
| 4,683,052 | 7/1987 | Degnan, Jr. et al. | 502/53 |
| 4,814,535 | 3/1989 | Yurchak | 585/640 |

Primary Examiner—Paul E. Konopka
Attorney, Agent, or Firm—Alexander J. McKillop; Charles J. Speciale; L. Gene Wise

[57] ABSTRACT

The invention comprises the discovery has been made that the reactivation of spent medium pore, shape selective metallosilicate catalyst particles can be enhanced by carrying out the removal of deactivating coke and carbonaceous deposits on the surface and within the pores of the catalyst using hydrogen in a two stage process. The first stage consists of reactivation with hydrogen at elevated temperature and relatively high pressure to crack, strip and remove the more volatile deactivating coke and carbonaceous components on the catalyst surface. The second stage of the reactivation process is carried out at low pressure and elevated temperature, leading to the stripping of the deactivating carbonaceous residue of low volatility on the catalyst surface and pores. The effect of the two stage regeneration process is to improve the removal of coke and carbonaceous materials from the catalyst surface, pores and voids providing a more effective reactivated catalyst.

9 Claims, 1 Drawing Sheet

FIG.
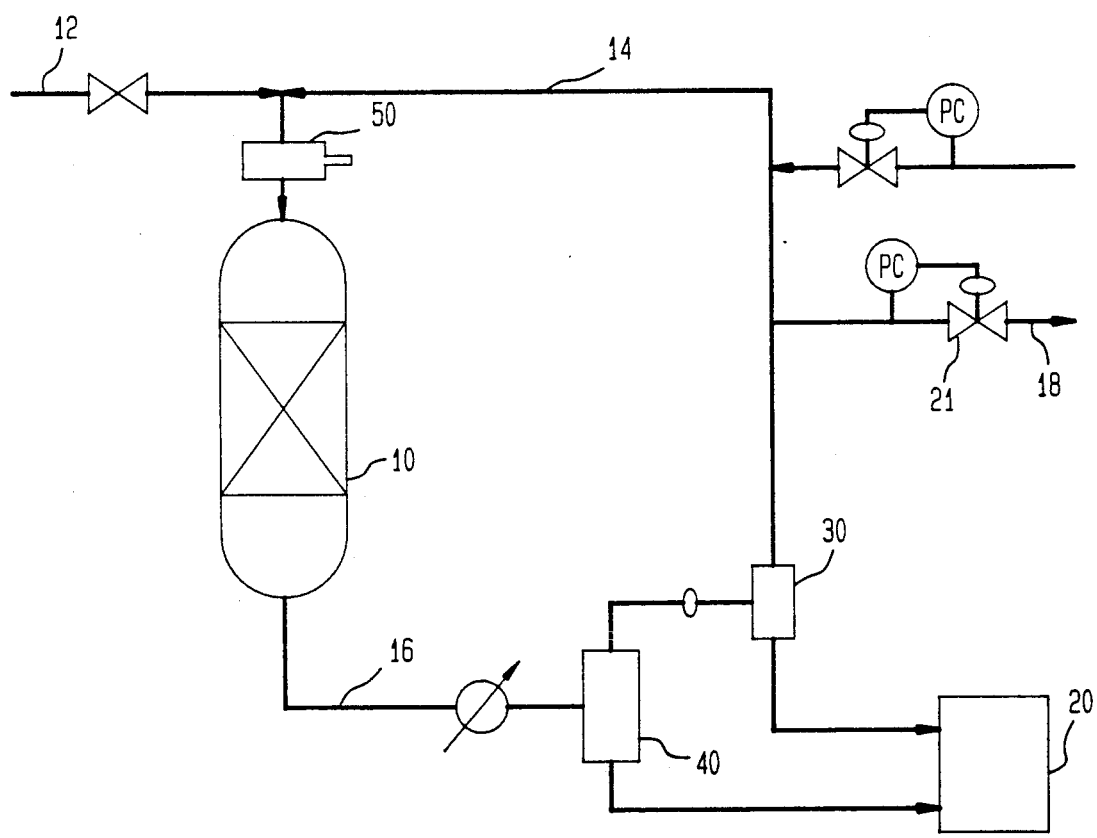

STAGED PROCESS FOR REACTIVATION OF SPENT ZEOLITE CATALYST PARTICLES

This invention relates to a process for the regeneration of spent metallosilicate catalyst particles. In particular, the invention relates to a process for reactivating or regenerating spent medium pore zeolite catalyst particles employing a two stage process using hydrogen as the reactivating medium.

BACKGROUND OF THE INVENTION

In recent years, a major development within the petroleum industry has been the discovery of the special catalytic capabilities of a family of zeolite catalyst based upon medium pore size shape selective metallosilicates. Discoveries have been made leading to a series of analogous processes drawn from the catalytic capability of zeolites. Depending upon various conditions of space velocity, temperature and pressure lower oxygenates, such as methanol, can be converted in the presence of zeolite type catalyst to olefins; olefins can catalytically oligomerize to provide gasoline or distillate or can be converted further to produce aromatics. Medium pore size zeolites have also been found to be particularly useful in some fluid catalytic cracking (FCC) operations and dewaxing lube feedstock or fuel oil boiling range materials to produce low pour point lubes or distillate. These, and other, analogous processes have come to be known in the art as the Methanol to Gasoline process (MTG), Mobil Olefins to Gasoline and Distillate (MOG and MOGD), the M2 Forming process for aromatics production, Mobil Distillate Dewaxing process (MDDW), and Mobil Lube Dewaxing process (MLDW).

The conversion of oxygenates is described by C. D. Chang, Catal. Rev.-Sci. Eng., 25, 1(1983) and in U.S. Pat. No. 3,931,349 to Kuo and U.S. Pat. No. 4,404,414 to Penick et al. Conversion of olefins to gasoline and/or distillate product is disclosed in U.S. Pat. Nos. 3,960,978 and 4,021,502 (Givens, Plank and Rosinski). In U.S. Pat. Nos. 4,150,062 and 4,227,992 Garwood et al discloses the operating conditions for the Mobil Olefin to Gasoline/Distillate (MOGD) process for selective conversion of $C_3+$ olefins. A fluidized bed process for converting ethene-containing light olefinic streams in the Mobil Olefin to Gasoline (MOG) process is described by Avidan et al in U.S. patent application 006,407, filed 23 Jan 1987. The phenomena of shape-selective polymerization are discussed by Garwood in ACS Symposium Series No. 218, Intrazeolite Chemistry, "Conversion of $C_2$-$C_{10}$ to Higher Olefins over Synthetic Zeolite ZSM-5", 1983 American Chemical Society. U.S. Pat. No. 3,827,968 (Givens et al) discloses a two stage operation wherein a mixed feed containing paraffins and olefins is upgraded in the absence of added hydrogen to a highly aromatic gasoline product. Catalyst dewaxing of lube stock (MLDW) using zeolite catalyst such as ZSM-5 is described in U.S. Pat. Nos. 4,181,598 to Gillespie et al., 4,259,170 to Graham et al. and 4,283,271 to Garwood et al.. Dewaxing of distillate fuel oils (MDDW) is described in U.S. Pat. No. 4,419,220 to LaPiere, et al. and 3,891,540 to Demmel et al. The Demmel et al patent also discloses the use of zeolite catalyst in fluid catalytic cracking (FCC). The foregoing patents are all of common assignee and all of the above references are incorporated herein in their entirety.

In the foregoing referenced processes zeolite catalyst can be regenerated in the conventional manner by contacting the catalyst with oxygen containing gas to effect the controlled burning of coke or other carbonaceous materials from the deactivated catalyst. However, catalyst regeneration by controlled burning of coke produces water which, at high temperatures, adversely effects the structure and activity of the zeolite catalyst. The need exits for better methods to regenerate medium pore zeolite catalyst.

In the prior art, several approaches have been reported regarding improved processes to regenerate zeolite catalysts.

Bowles, in U. S. Pat. No. 3,412,013, teaches contacting a zeolite catalyst with a hydrogen containing gas at temperatures of about 900° F. (482° C. to 1400° F. (760° C.). Haag et al., in U.S. Pat. Nos. 4,508,836 and 4,358,395, teaches the regeneration of deactivated ZSM-5 type catalyst by contacting spent catalyst with hydrogen gas at a temperature of about 800° F. (427° C. to 1200° F. (649° C.). The Bowles patent teaches regeneration with hydrogen in a fluidized dense bed. The Haag et al. patent teaches hydrogen regeneration of a selectively precoked catalyst.

In processes such as MLDW, spent zeolite catalyst is regenerated by treatment with hydrogen to provide a rejuvenated catalyst wherein a major portion of the coke and carbonaceous deposits have been removed. Nevertheless, a more complete removal of these deactivating deposits would more effectively restore catalyst activity and extend catalyst life.

It is an object of the present invention to provide an improved process for the reactivation of spent zeolite catalyst particles.

Another object of the invention is to provide a process for the reactivation of spent medium pore zeolite particles carried out using hydrogen as the rejuvenating agent.

A further object of the present invention is to provide an improved process to extend catalyst life by utilizing hydrogen reactivation or rejuvenation of spent catalyst in conversion processes such as lube dewaxing or olefins oligomerization that use medium pore zeolite catalyst particles.

SUMMARY OF THE INVENTION

The discovery has been made that the reactivation of spent medium pore, shape selective metallosiliate catalyst particles can be enhanced by carrying out the removal of deactivating coke and carbonaceous deposits on the surface and within the pores of the catalyst using hydrogen in a two stage process. The first stage consists of reactivation with hydrogen at elevated temperature and relatively high pressure to crack, strip and remove at least a portion of the cracked coke and the more volatile deactivating coke and carbonaceous components on the catalyst surface. The second stage of the reactivation process is carried out at low pressure and elevated temperature, leading to the stripping of the deactivating carbonaceous components of low volatility on the catalyst surface and pores. The effect of the two stage reactivation process is to improve the removal of coke and carbonaceous materials from the catalyst surface, providing a more effective reactivated catalyst.

More particularly, a process is disclosed for the reactivation of spent medium pore metallosilicate catalyst particles containing carbonaceous deposits, comprising:

contacting the spent catalyst particles with hydrogen at high pressure and elevated temperature under first stage catalyst reactivation conditions to partially reactivate the spent particles; and contacting the partially reactivated particles with hydrogen or other light gases such as $N_2$ or refinery fuel gas at elevated temperature, under second stage catalyst reactivation conditions, at a pressure substantially lower than the first stage, whereby reactivated metallosilicate catalyst particles are produced.

In a preferred embodiment of the invention the low pressure step is carried out at a gas velocity through the reactor at least twice that of the first stage. The second stage is a stripping stage and any suitable light gas can be used, preferably hydrogen.

Moreover, the invention comprises a process for the catalytic conversion of an oxygenate feedstream or an olefinic hydrocarbon feedstream to gasoline boiling range components with spent catalyst reactivation, comprising:

contacting said oxygenate feedstream or olefinic hydrocarbon feedstream with shape selective, medium pore metallosilicate catalyst particles under conditions sufficient to convert said oxygenate feedstream or olefinic hydrocarbon feedstream to gasoline boiling range components; and reactivating spent metallosilicate catalyst particles according to the invention as described above.

DESCRIPTION OF THE FIGURE

The Figure is a schematic drawing illustrating an application of the present invention.

DETAIL DESCRIPTION OF THE INVENTION

The novel process for reactivation of spent medium pore zeolite catalyst particles described herein is applicable to fixed bed and fluid bed processes employing medium pore zeolite catalyst particles for the conversion of oxygenates to gasoline (MTG), the conversion or oligomerization of light olefins to gasoline boiling range and higher molecular weight hydrocarbons (MOG and MOGD processes), dewaxing of lube stock or fuel oil (MLDW and MDDW processes), catalytic cracking (FCC), and similar metallosilicate catalyzed oxygenate or hydrocarbon conversion processes having in common the deactivation of catalyst by the deposition of coke and other carbonaceous material on the catalyst surface and within the catalyst pores. These include zeolite catalyzed olefin isomerization, aromatization (M-2 Forming), and dehydrogenation. The zeolite catalyst may contain other metals such as platinum, palladium and/or tin.

The term oxygenates as used herein includes $C_1$–$C_8$ aliphatic alkanol and ethers. Light olefins include $C_2$–$C_4$ olefins and the term hydrocarbon includes alkane and alkene. The term distillate or distillate feedstock as used herein refers to those hydrocarbon products commercially utilized as fuel oil, diesel fuel, tractor oil and the like, following dewaxing. They are typically produced from catalytic cracking operations to reduce waxy n-paraffins and have an initial boiling point between about 160° C. and 250° C., up to about 375° C. at their 90 percent ASTM distillation level.

Operating conditions for the conversion of oxygenates to gasoline, the MTG process, using zeolite catalyst are described in U.S. Pat. No. 4,814,535 to Yurchak. Operating details for typical olefin oligomerization units, the MOG process, using zeolite catalyst are disclosed in U.S. Pat. Nos. 4,456,779 and 4,497,968 to Owen et al.; and 4,433,185 to Tabak. These patents are incorporated herein by reference.

Catalysts useful in the foregoing processes and the processes of the instant invention include a unique group of metallosilicate zeolites. Recent developments in zeolite technology have provided a group of medium pore siliceous materials having similar pore geometry. Most prominent among these intermediate pore size zeolites is ZSM-5, which is usually synthesized with Bronsted acid active sites by incorporating a tetrahedrally coordinated metal, such as Al, Ga, or Fe, within the zeolytic framework. These medium pore zeolites are favored for acid catalysis; however, the advantages of ZSM-5 structures may be utilized by employing highly siliceous materials or crystalline metallosilicate having one or more tetrahedral species having varying degrees of acidity. ZSM-5 crystalline structure is readily recognized by its X-ray diffraction pattern, which is described in U.S. Pat. No. 3,702,866 (Argauer, et al.), incorporated by reference.

Representative of the shape selective, metallosilicate zeolites are ZSM-5, ZSM-11, ZSM-12, ZSM-22, ZSM-23, ZSM-34, ZSM-35, ZSM-48 and zeolite Beta. ZSM-5 is disclosed in U.S. Pat. No. 3,702,886 and U.S. Pat. No. Reissue 29,948. Other suitable zeolites are disclosed in U.S. Pat. Nos. 3,709,979 (ZSM-11); 3,832,449 (ZSM-12); 4,076979; 4,076842 (ZSM-23); 4,016,245 (ZSM-35); and 4,375,573 (ZSM-48). Zeolite Beta is described in U.S. Reissue Pat. No. 28,341 (of original U.S. Pat. No. 3,308,069), to which reference is made for details of this catalyst. The disclosures of these patents are incorporated herein by reference.

The spent zeolite catalyst derived from the above processes contains complex deposits of high molecular weight coke and hydrocarbon material contained within the pores of the catalyst and on non-pore surfaces. Typically, these deposits are removed, or at least reduced, by combustion with oxygen to restore catalyst activity. However, the combustion process is highly energetic and difficult to control with precision on the catalyst surfaces. At the high temperatures experienced in the regeneration combustion process localized overheating can occur and water produced by the combustion process can react with and alter the structure of the catalyst, with a consequent reduction in catalyst activity and life. As an alternative, catalyst regeneration with hydrogen at elevated temperature can be employed to crack the large hydrocarbon molecules and remove the resultant smaller, more volatile molecules by stripping. Cracking with hydrogen gas avoids the exotherm and controllability problem associated with reactivation by combustion. However, as practiced in the art heretofore, high pressures as well as elevated temperatures are required to effectively crack the large carbonaceous molecules. These high pressures work against the effective hydrogen stripping of the residue of cracked molecules that still comprise relatively high molecular weight, low vapor pressure material.

It has now been discovered that hydrogen gas reactivation of spent zeolite catalyst can be carried more effectively in a two stage process to produce a reactivated catalyst containing a lower residue of carbonaceous material compared to the reactivated catalyst from prior art single stage regeneration using hydrogen. In the two stage process of the invention, the first stage is carried out under typical conditions of high pressure and elevated temperature. However, in the second stage the pressure is reduced while the elevated temperature conditions of the first stage are maintained or increased. At the lower pressure condition, the carbonaceous residue comprising cracked material of low vapor pressure is now more effectively stripped by hydrogen or any other gas, yielding a substantially fully reactivated catalyst.

The first stage catalyst reactivation operation can be carried out at temperatures between about 250° C. and 550° C. and at pressures between about 2000 kPa and 20,000 kPa, with hydrogen flow rates between about 100 and 1500 SCF/cu ft of catalyst/hour. The preferred first stage conditions comprise temperatures between about 260° C. and 815° C. with pressure above 1120 kPa. The second stage catalyst regeneration operation is preferably carried out at temperatures between about 300° C. and 600° C. and at pressures between about 3000 kPa and 9000 kPa, with hydrogen flow rates between about 20 and 500 SCF/cu ft of catalyst/hr.

The preferred second stage conditions comprise temperatures than 360° C. with pressure less than 1950 kPa. The second stage operation may be carried out at a higher operating temperature than the first stage since the first stage operating temperature during reactivation is limited by design temperature. The second stage can operate at higher temperature than the maximum allowable temperature of the equipment since the operating pressure is significantly below the equipment maximum operating pressure.

While the reactivation process disclosed herein is useful for the reactivation of zeolite catalyst employed in any of the previously referenced processes, it is particularly useful and preferred for the regeneration of catalyst in the fixed bed, ZSM-5 catalyzed process to dewax lube oil stock containing high melting point n-paraffins (MLDW). Accordingly, the following Example is presented based on the MLDW process, including catalyst regeneration as illustrated in the Figure.

EXAMPLE I

In the MDLW process a suitable feed, which may be a crude oil hydrockrackate, and hydrogen is contacted in a fixed bed with a medium pore metallosilicate catalyst, preferably ZSM-5, at pressure between about 3500-21000 kPa (500-3000 psig) and temperature between about 232-482° C.; a liquid hourly space velocity between 0.2-20 and $H_2$ gas between 500-20,000 SCF/BBL. Typically, the dewaxed effluent is hydrotreated and separated to recover a low pour point lubricant oil. Catalyst reactivation is carried out by interrupting the flow of feed to the MDLW fixed bed reactor and reactivating catalyst at temperatures between about 260° C. and 815° C. with pressure above 2500 kPa.

Referring to the Figure, the catalyst reactivation mode of the MLDW process is illustrated, embodying the process of the present invention. The process includes a fixed bed ZSM-5 dewaxing reactor vessel 10, heater 50, product recovery section 20, and high temperature and low temperature separators 40 and 30. In the regeneration mode, oil flow 12 to the reactor is shut down and hydrogen fed 14 to the reactor at pressure between about 3500-21000 kPa (500-3000psig) and temperature between about 232-482° C. and removed through conduit 16 and purge line 18. After a suitable first stage reactivation period, pressure in the reactor is reduced to less than 1020 kPa through pressure control valve 21 and the temperature is increased to about 550° C. to complete the second stage of the catalyst regeneration. Upon completion of the second stage or step of catalyst regeneration dewaxing condition are resumed and the flow of oil feed to the reactor is reinitiated.

EXAMPLE II

The efficacy of the present invention is further demonstrated by computer simulation of catalyst reactivation according to the novel process in comparison with catalyst reactivation as carried out in the prior art. In Example II a computer simulation is presented of spent zeolite catalyst reactivation as carried out in a fluid bed version of the known Mobil lube dewaxing process (MLDW), Case A, and compared to the MLDW process incorporating the reactivation process of the instant invention, Case B and Case C, of stripping coke from MLDW catalyst at a relatively low pressure with hydrogen Coke on the spent catalyst is simulated as a liquid with a molecular weight of 1000 lb/ lb mol, density of 5 API and boiling point of 1300° F. (704° C.).

For Case A, a conventional reactivation operation is simulated wherein 400 lb/hr of coke, equivalent to 20,000 lb/hr of catalyst with 2 wt % coke, is fed to a reactor vessel containing a fluid bed of zeolite catalyst at 500 psia (3500 kPa) and 1000° F. (538° C.). The coke is stripped off the catalyst at a hydrogen flow rate of 60.46 lbmol/hr. Out of the 400 lb/hr of coke, only 62.5 lb/hr of coke is stripped into the vapor stream.

For Case B, the same amount of coke is fed into a fluid bed at 70 psia (490 kPa) and 1000° F. (538° C.). The majority of coke (98 wt %) is stripped off by hydrogen at the same flow rate as in Case A.

For Case C, the simulation includes the inclusion of a low pressure stripping vessel downstream of the MLDW fluid bed reactor (Phase 2). Reactivation is carried out as in Case A (Phase 1). Then partially reactivated catalyst is passed to the stripper vessel at 1000° F. (538° C.) and 490 (kPa) with a hydrogen flow rate of 60.46 lbmol/hr. Under these conditions all of the coke remaining on the catalyst (337.5 lb/hr) is removed by stripping. The results of the simulation are summaried in Table 1.

Under the process of the invention, coke becomes more volatile at lower pressure in the presence of light gas such as hydrogen. Lowering the reactivator pressure or adding a second stage reactivator at low pressure allows a more effective reactivation of the catalyst.

While the present invention is illustrated by utilizing regeneration of fluid catalyst bed, the novel process is equally applicable to fixed beds of catalyst and reactivation of fixed catalyst beds.

TABLE 1

| | CASE | | | |
|---|---|---|---|---|
| | | | C | |
| | A | B | Phase 1 | Phase 2 |
| Coke lb/hr | 400 | 400 | 400 | 337.5 |
| Press. psia | 500 | 70 | 500 | 70 |
| Temp. °F. | 1000 | 1000 | 1000 | 1000 |
| $H_2$ Flow Lbmol/hr | 60.46 | 60.46 | 60.46 | 60.46 |
| Coke Remaining wt % | 84.4 | 2 | 84.4 | 0 |

While the invention has been described by reference to specific embodiments, there is no intent to limit the scope of the invention except as described in the following claims.

What is claimed is:

1. A process for the reactivation of spent medium pore metallosilicate catalyst particles containing carbonaceous deposits, comprising:

contacting said spent catalyst particles with hydrogen at pressure between about 3500 and 21000 kPa and temperature between 260° C. and 815° C. under first stage catalyst reactivation conditions to partially reactivate said spent particles; and contacting said partially reactivated particles with a light gas stream selected from the group consisting of hydrogen, nitrogen, and refinery fuel gas at temperature greater than 360° C., under second stage catalyst reactivation conditions, at a pressure substantially lower than said first stage sufficient to provide a pressure differential between said first and said second stage of at least 3010 kPa, whereby reactivated metallosilicate catalyst particles are produced.

2. The process of claim 1 wherein said medium pore metallosilicate catalyst particles include ZSM-5, ZSM-11, ZSM-12, ZSM-22, ZSM-23, ZSM-34, ZSM-35, ZSM-48 and zeolite Beta.

3. The process of claim 1 wherein said spent medium pore metallosilicate catalyst particles are contained in a fixed catalyst bed which is sequentially operated under said first stage and said second stage catalyst reactivation conditions.

4. The process of claim 1 wherein said spent medium pore metallosilicate catalyst particles comprise a fluidized bed of catalyst particles sequentially reactivated under said first stage and said second stage catalyst reactivation conditions.

5. The process of claim 1 wherein said spent catalyst comprises medium pore metallosilicate catalyst particles from an oxygenates to gasoline conversion zone.

6. The process of claim 1 wherein said spent catalyst comprises medium pore metallosilicate catalyst particles from a light olefins oligomerization zone.

7. The process of claim 1 wherein said spent catalyst comprises medium pore metallosilicate catalyst particles from a liquid hydrocarbon cracking or dewaxing zone.

8. A process for the catalytic conversion of an oxygenate feedstream or an olefinic hydrocarbon feedstream to gasoline boiling range components with spent catalyst reactivation, comprising:

contacting said oxygenate feedstream or olefinic hydrocarbon feedstream with shape selective, medium pore metallosilicate catalyst particles under conditions sufficient to convert said oxygenate feedstream or olefinic hydrocarbon feedstream to gasoline boiling range components; and contacting spent metallosilicate catalyst particles with hydrogen at pressure between about 7500 and 21000 kPa and temperature between about 260° C. and 815° C. under first stage catalyst reactivation conditions to partially reactivate said spent particles; and contacting said partially reactivated particles with a light gas stream selected from the group consisting of hydrogen, nitrogen and refinery fuel gas at temperature greater than 360° C., under second stage catalyst reactivation conditions, at a pressure substantially lower than said first stage sufficient to provide a pressure differential between said first and said second stage of at least 3010 kPa, whereby reactivated metallosilicate catalyst particles are produced.

9. The process of claim 8 wherein said medium pore metallosilicate catalyst particles include ZSM-5, ZSM-11, ZSM-12, ZSM-23, ZSM-35, and ZSM-48.

* * * * *